(12) United States Patent
Suzuki

(10) Patent No.: US 11,463,022 B2
(45) Date of Patent: Oct. 4, 2022

(54) DRIVING CONTROL APPARATUS, DRIVING APPARATUS AND DRIVING CONTROL METHOD

(71) Applicant: CANON KABUSHIKI KAISHA, Tokyo (JP)

(72) Inventor: Kyouhei Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 17/123,009

(22) Filed: Dec. 15, 2020

(65) Prior Publication Data

US 2021/0194387 A1 Jun. 24, 2021

(30) Foreign Application Priority Data

Dec. 18, 2019 (JP) .............................. JP2019-227908

(51) Int. Cl.
*H02N 2/06* (2006.01)
(52) U.S. Cl.
CPC ............. *H02N 2/067* (2013.01); *H02N 2/062* (2013.01)
(58) Field of Classification Search
CPC ........ H02N 2/067; H02N 2/062; H02N 2/026; H02N 2/0075; H02N 2/008
See application file for complete search history.

(56) References Cited

U.S. PATENT DOCUMENTS 5,945,768 A * 8/1999 Treu, Jr. ................. H02N 2/147
310/316.01
9,823,543 B2 * 11/2017 Atsuta .................... H02N 2/001

FOREIGN PATENT DOCUMENTS

JP 2012-023917 A 2/2012

* cited by examiner

*Primary Examiner* — Emily P Pham
(74) *Attorney, Agent, or Firm* — Cowan, Liebowitz & Latman P.C.

(57) ABSTRACT

A driving control apparatus that controls driving of a vibration actuator having a plurality of electromechanical energy conversion elements. The driving control apparatus includes a controller configured to generate a plurality of driving signals each of which has a same waveform and has a different phase, and to respectively apply the plurality of driving signals to different elements of the plurality of electromechanical energy conversion elements. The controller changes the waveform according to the phase. A shape of a first waveform according to a first phase is closer to a square wave shape than a shape of a second waveform according to a second phase that is larger than the first phase.

15 Claims, 10 Drawing Sheets

DRIVING CONTROL APPARATUS, DRIVING APPARATUS AND DRIVING CONTROL METHOD

BACKGROUND OF THE INVENTION

Field of the Invention

The present invention relates to a driving control apparatus, a driving apparatus, and a driving control method.

Description of the Related Art

Conventionally, a vibration actuator is known which relatively moves a vibrator and a driven body by causing the vibrator to vibrate, the vibrator being vibrated by pressuring and contacting a driven body and the vibrator that is formed by joining an electromechanical energy conversion element and an elastic body, and by applying a driving signal to the electromechanical energy conversion element. Japanese Patent Laid-Open No. ("JP") 2012-23917 discloses a driving apparatus that suppresses noise generated at a time of starting and stopping, by controlling a driving signal to apply to a vibration actuator.

Although JP 2012-23917 discloses control of the driving signal at the time of starting and stopping, does not disclose control of the driving signal for driving the vibration actuator with low power and high torque.

SUMMARY OF THE INVENTION

The present invention provides a driving control apparatus, a driving apparatus, and a driving control method each of which can drive a vibration actuator with low power and high torque.

A driving control apparatus as one aspect of the present invention controls driving of a vibration actuator having a plurality of electromechanical energy conversion elements. The driving control apparatus includes a controller configured to generate a plurality of driving signals each of which has a same waveform and has a different phase, and to respectively apply the plurality of driving signals to different elements of the plurality of electromechanical energy conversion elements. The controller changes the waveform according to the phase. A shape of a first waveform according to a first phase is closer to a square wave shape than a shape of a second waveform according to a second phase that is larger than the first phase.

A driving apparatus having above driving control apparatus, and a driving control method for the driving control apparatus also constitute another aspect of the present invention.

Further features of the present invention will become apparent from the following description of exemplary embodiments with reference to the attached drawings.

DESCRIPTION OF THE EMBODIMENTS

Figure 1:
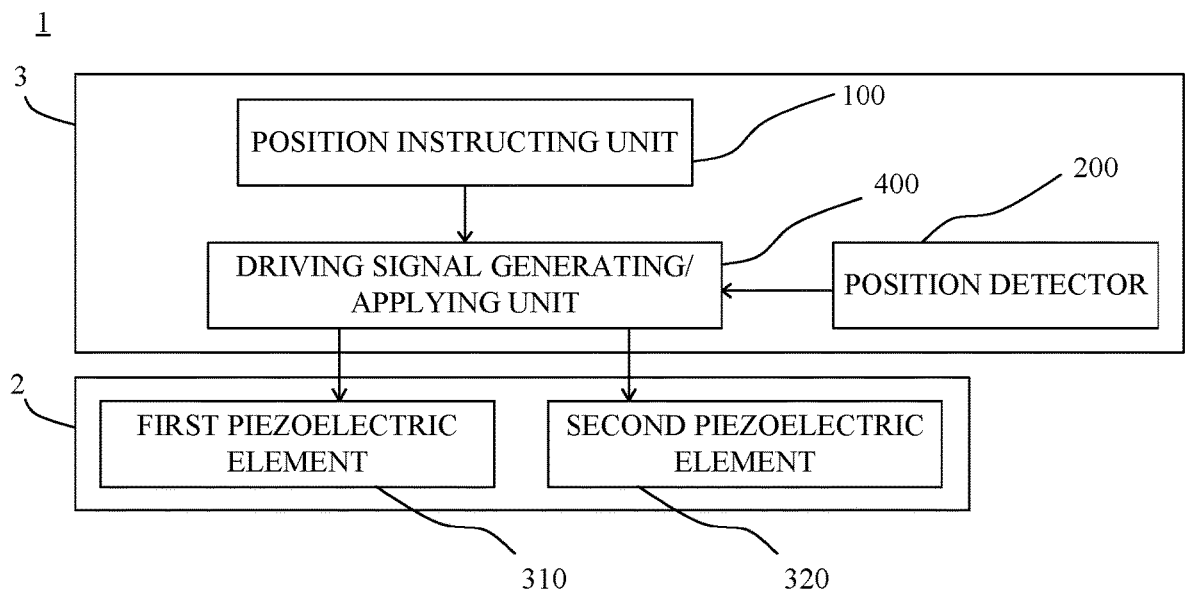
FIG. 1 is a configuration diagram illustrating a driving system according to an embodiment of the present invention.

Referring now to the accompanying drawings, a description will be given of an embodiment according to the present invention. Corresponding elements in respective figures will be designated by the same reference numerals, and a description thereof will be omitted.

FIG. 1 is a block diagram illustrating a driving system (driving apparatus) 1 according to the embodiment of the present invention. The driving system 1 includes a vibration actuator 2 and a driving control apparatus 3 configured to control driving of the vibration actuator 2. The vibration actuator 2 includes a first piezoelectric element 310 and a second piezoelectric element 320. The first and second piezoelectric elements 310 and 320 are electromechanical energy conversion elements in each of which a displacement occurs when a voltage is applied. The driving control apparatus 3 includes a position instructing unit 100, a position detector 200, and a driving signal generating/applying unit 400 as a controller. The position instructing unit 100 is configured to instruct a target position to reach or a target velocity of a movable portion (not illustrated). The position detector 200 is configured to acquire a current position of the movable portion. The driving signal generating/applying unit 400 is configured to generate a driving signal (voltage) required for the movable portion to reach the target position with the target velocity, by using the instruction from the position instructing unit 100 and the current position of the movable portion acquired from the position detector 200. The driving signal generating/applying unit 400 is configured to apply the generated driving signal to the first and second piezoelectric elements 310 and 320. In this embodiment, the driving signal is a voltage, but the present invention is not limited to this. This embodiment uses two electromechanical energy conversion elements, but the number of electromechanical energy conversion elements is not limited to this.

Figure 2:
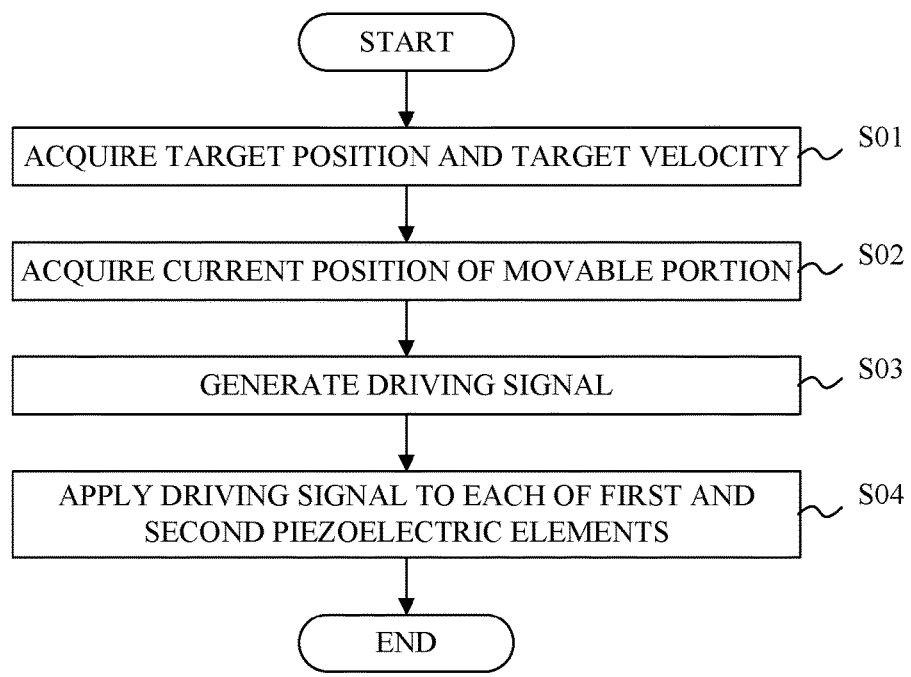
FIG. 2 is a flowchart illustrating a flow of basic operation of a vibration actuator.

FIG. 2 is a flowchart illustrating a basic operation flow of the vibration actuator 2. In step S0L the driving signal generating/applying unit 400 acquires the target position and target velocity from the position instructing unit 100. In step S02, the driving signal generating/applying unit 400 acquires the current position of the movable portion detected by the position detector 200. In step S03 as a generating step, the driving signal generating/applying unit 400 generates the driving signal by using the target position and the target velocity acquired from the position instructing unit 100 and the current position of the movable portion acquired from the position detector 200. In step S04 as an applying step, the driving signal generating/applying unit 400 applies the driving signal generated in step S03 to each of the first and second piezoelectric elements 310 and 320. Thereby, the movable portion is moved of the vibration actuator for moving the movable portion.

Figure 3:
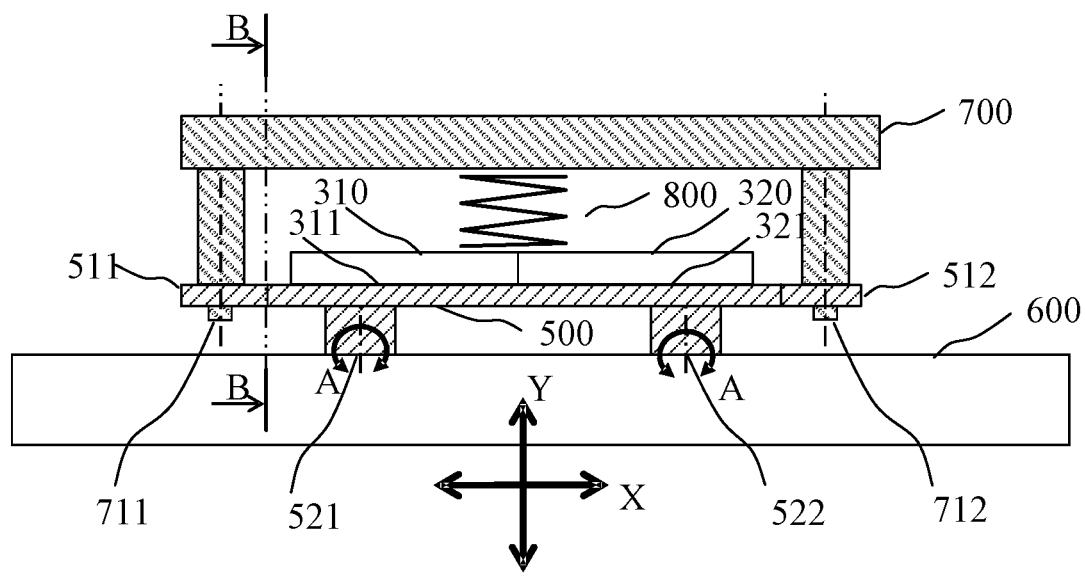
FIG. 3 is a schematic diagram illustrating a mechanical part of the vibration actuator.

Hereinafter, a description will be given of an outline of a mechanical part of the vibration actuator 2 with reference to FIG. 3. FIG. 3 is a schematic diagram illustrating the mechanical part of the vibration actuator 2. The first and second piezoelectric elements 310 and 320 are cemented to an elastic body 500 at cemented surfaces 311 and 321 respectively. The first and second piezoelectric elements 310 and 320 are cemented to the elastic body 500 by adhesion with adhesive (not illustrated) or the like.

Connecting portions 511 and 512 provided on the elastic body 500 are respectively fixed to convex portions 711 and 712 of a holder 700 by adhesion or the like. Hence, the elastic body 500 is fixed to the holder 700. The holder 700 is fixed to a fixed portion (not illustrated). In this embodiment, the first piezoelectric element 310, the second piezoelectric element 320, the elastic body 500, and the holder 700 are fixed to the fixed portion, and thus do not move even when the movable portion of the vibration actuator moves.

A pressurizing spring 800 is a compression spring in which a first end contacts the holder 700 and a second end contacts at least one of the first and second piezoelectric elements 310 and 320, and in which spring force is generated in a Y direction. Pressing force of the pressurizing spring 80 makes the elastic body 500 pressurized to the holder 700 in a downward direction of the drawing. In this embodiment, the elastic body 500 is pressurized by the compression spring, but the present invention is not limited to this.

The elastic body 500 includes projection portion tips 521 and 522 that are pressurized and contacted to a friction member 600 as a driven body when pressurized by the pressurizing spring 800, the friction member 600 being disposed directly under the elastic body 500. The friction member 600 is fixed to the movable portion. When the driving signal generating/applying unit 400 applies a driving signal, that has a period close to a period of a resonance frequency of the elastic body 500, to each of the first and second piezoelectric elements 310 and 320, the elastic body 500 resonates and the projection portion tips 521 and 522 moves in a spheroidal motion indicated by an arrow A. The friction force propagates the spheroidal motion of the projection portion tips 521 and 522 to the friction member 600 which is pressurized and contacted to the projection portion tips 521 and 522, and the friction member 600 performs a translation movement in an X direction. Since the elastic body 500 is fixed to the fixed portion and the friction member 600 is fixed to the movable portion, the movable portion performs the translation movement in the X direction relative to the fixed portion according to the above-described operation. In this embodiment, the elastic body 500 is fixed to the fixed portion, the friction member 600 is fixed to the movable portion, and the friction member 600 moves, but the elastic body 500 may be fixed to the movable portion, the friction member 600 may be fixed to the fixed portion, and the elastic body 500 may be moved. In that case, the fixed movable portion of the elastic body 500 becomes a driven body that is moved by force of the vibration actuator. The movable portion may be a member of various devices such as a lens holding frame for holding a lens in an optical apparatus and an image sensor holding frame for holding an image sensor in an image pickup apparatus. That is, use of the present invention is not limited as long as the present invention is used in a driving apparatus including a vibration actuator having an electromechanical energy conversion element, a controller for generating a driving signal of the electromechanical energy conversion element, and a driven body which is moved by the force of the vibration actuator.

Figure 4A:
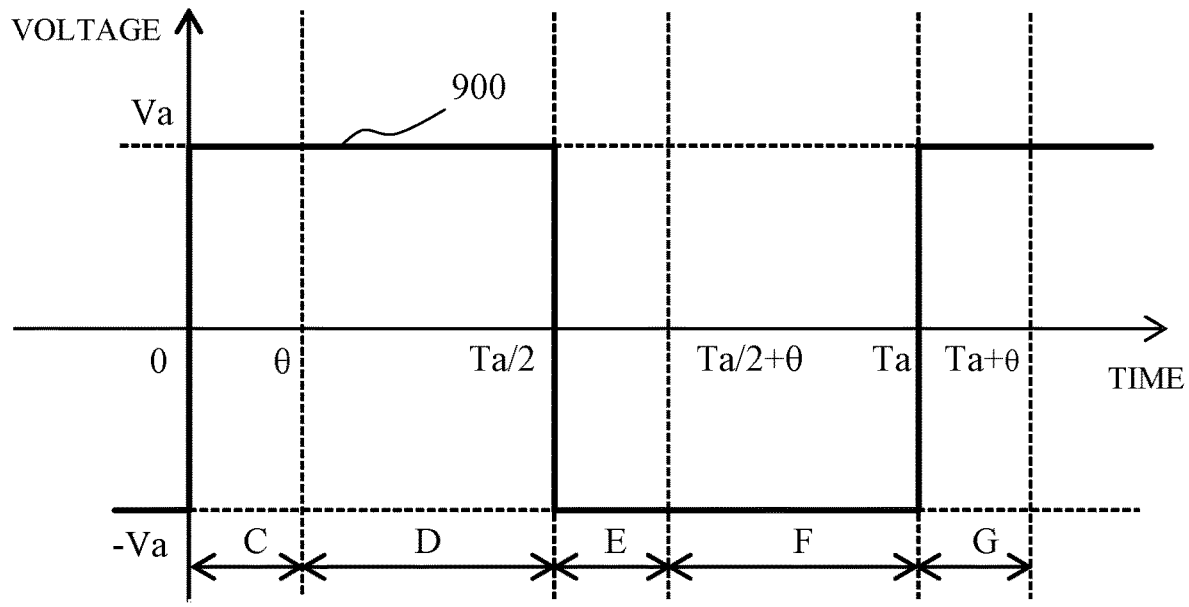
FIGS. 4A and 4B are diagrams illustrating an example of a driving signal applied to a piezoelectric element.
Figure 4B:
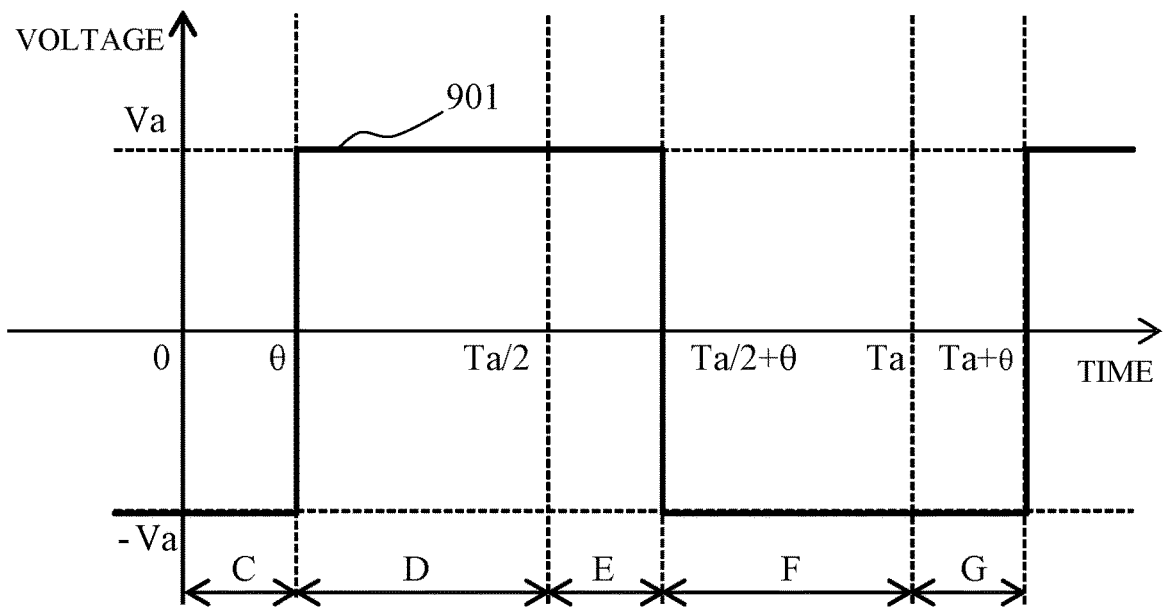

Hereinafter, the details will be described of a spheroidal motion occurring in the projection portion tips 521 and 522 with reference to FIGS. 4A and 4B. FIGS. 4A and 4B are diagrams which illustrate an example of driving signals respectively applied to the first and second piezoelectric elements 310 and 320. In FIGS. 4A and 4B, a horizontal axis represents time and a vertical axis represents a voltage that is a signal value. Driving signals (periodic square wave) 900 and 901 are both square wave shape signals each of which has an amplitude of Va and a period of Ta, and are respectively applied to the first and second piezoelectric elements 310 and 320. The driving signal 901 applied to the second piezoelectric element 320 has a phase shifted by θ from that of the driving signal 900 applied to the first piezoelectric element 310.

In this embodiment, when a positive voltage is applied, both the first and second piezoelectric elements 310 and 320 extend in a planar direction parallel to the cemented surfaces 311 and 321 and contract in a thickness direction orthogonal to the cemented surfaces 311 and 321. When a negative voltage is applied, both the first and second piezoelectric elements 310 and 320 contract in the planar direction parallel to the cemented surfaces 311 and 321 and extend in the thickness direction orthogonal to the cemented surfaces 311 and 321.

FIGS. 5A and 5B to FIGS. 8A and 8B illustrate deformation states of the first and second piezoelectric elements 310 and 320 and the elastic body 500 when the driving signals 900 and 901 are applied to the first and second piezoelectric elements 310 and 320, respectively. FIGS. 5A, 6A, 7A and 8A are sectional views on a line BB of FIG. 3. Each of FIGS. 5B, 6B, 7B and 8B illustrates the first and second piezoelectric elements 310 and 320 and the elastic body 500 in a view from the same direction as that in FIG. 3.

Each of arrows 531a, 531b, 531c, and 531d indicates a movement of the projection portion tip 521. Each of arrows 532a, 532b, 532c, and 532d indicates a movement of the projection portion tip 522. Positions indicated by dots are positions of the projection portion tips 521 and 522 when no voltage is applied to the first and second piezoelectric elements 310 and 320 and no deformation occurs in the elastic body 500. Positions of arrow tips are positions of the projection portion tips 521 and 522 when a voltage is applied to the first and second piezoelectric elements 310 and 320 and deformation occurs in the elastic body 500.

Figure 5A:
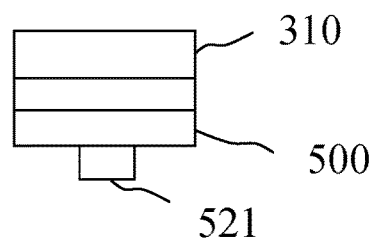
FIGS. 5A and 5B are schematic views illustrating one form of a deformation state of an elastic body.
Figure 5B:
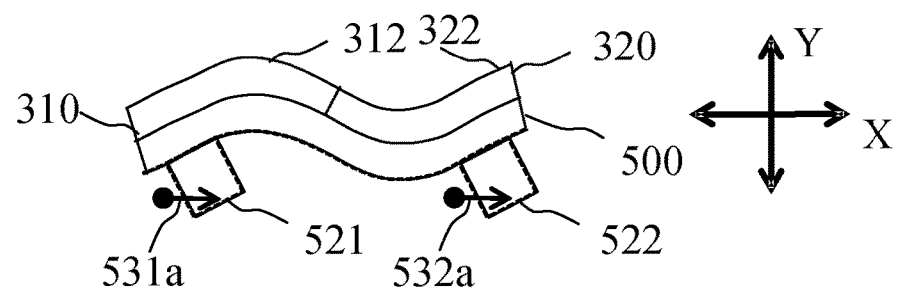

FIGS. 5A and 5B illustrate deformation states of the first and second piezoelectric elements 310 and 320 and the elastic body 500 during a section C from time 0 to time θ in FIGS. 4A and 4B. During the section C, positive and negative voltages are applied to the first and second piezoelectric elements 310 and 320, respectively. In the planar direction parallel to the cemented surfaces 311 and 321, the first piezoelectric element 310 extends and the second piezoelectric element 320 contracts. Since the elastic body 500 maintains its original size, a bending deformation occurs, a non-cemented surface 312 of the first piezoelectric element 310 becomes convex, and a non-cemented surface 322 of the second piezoelectric element 320 becomes concave. The projection portion tips 521 and 522 move in a rightward direction of FIGS. 5A and 5B, as respectively indicated by the arrows 531a and 532a.

Figure 6A:
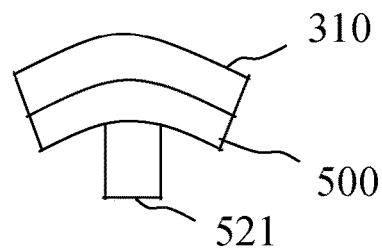
FIGS. 6A and 6B are schematic views illustrating one form of the deformation state of the elastic body.
Figure 6B:
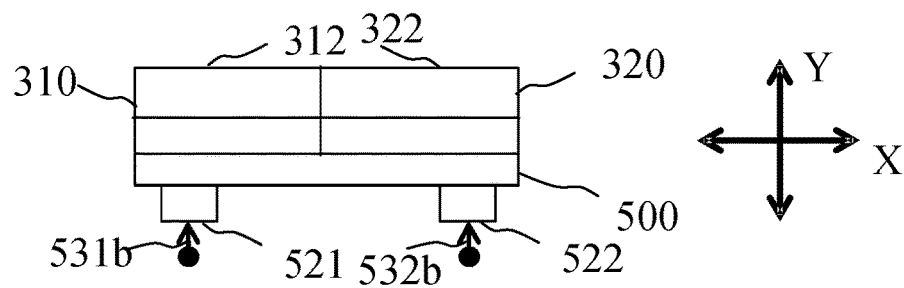

FIGS. 6A and 6B illustrate deformation states of the first and second piezoelectric elements 310 and 320 and the elastic body 500 during a section D from the time θ to time Ta/2 in FIGS. 4A and 4B. During the section D, positive voltages are applied to both the first and second piezoelectric elements 310 and 320. Thus, in the planar direction parallel to the cemented surfaces 311 and 321, both the first and second piezoelectric elements 310 and 320 extends. Since the elastic body 500 maintains its original size, a bending deformation occurs, and both the non-cemented surfaces 312 and 322 become convex. The projection portion tips 521 and 522 move in an upward direction of FIGS. 6A and 6B, as respectively indicated by the arrows 531b and 532b.

Figure 7A:
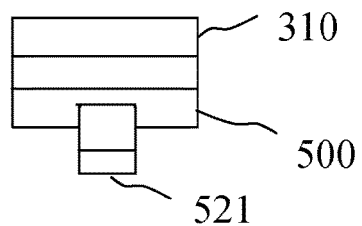
FIGS. 7A and 7B are schematic views illustrating one form of the deformation state of the elastic body.
Figure 7B:
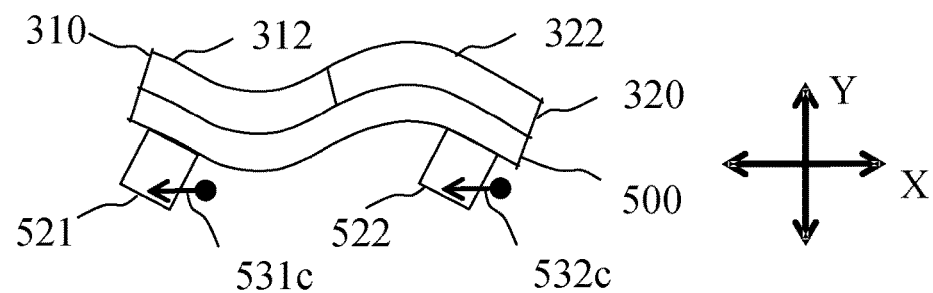

FIGS. 7A and 7B illustrates deformation states of the first and second piezoelectric elements 310 and 320 and the elastic body 500 during a section E from the time Ta/2 to time Ta/2+θ in FIGS. 4A and 4B. During the section E, negative and positive voltages are applied to the first and second piezoelectric elements 310 and 320, respectively. Thus, in the planar direction parallel to the cemented surfaces 311 and 321, the first piezoelectric element 310 contracts and the second piezoelectric element 320 expands. Since the elastic body 500 maintains its original size, a bending deformation occurs, the non-cemented surface 312 becomes concave, and the non-cemented surface 322 becomes convex. The projection portion tips 521 and 522 move in a leftward direction in FIGS. 7A and 7B, as respectively indicated by the arrows 531c and 532c.

Figure 8A:
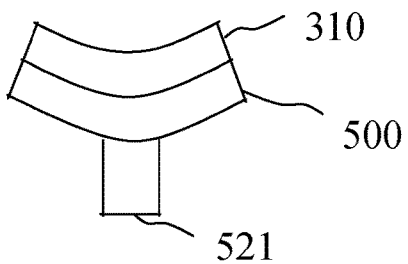
FIGS. 8A and 8B are schematic views illustrating one form of the deformation state of the elastic body.
Figure 8B:
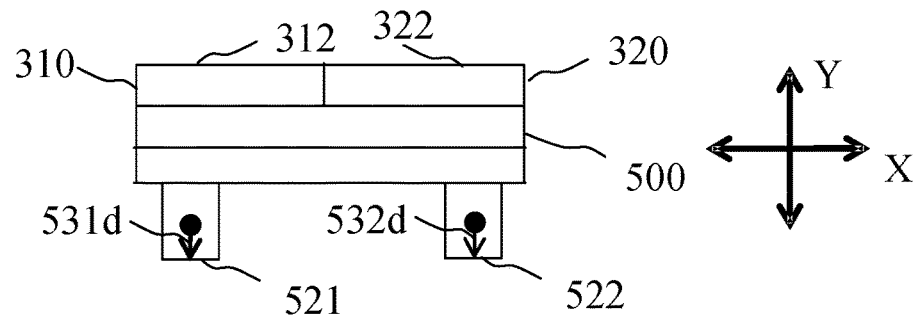

FIGS. 8A and 8B illustrate the deformation states of the first and second piezoelectric elements 310 and 320 and the elastic body 500 during a section F from the time Ta/2+θ to time Ta in FIGS. 4A and 4B. During the section F, negative voltages are applied to both the first and second piezoelectric elements 310 and 320. Thus, in the planar direction parallel to the cemented surfaces 311 and 321, both the first and second piezoelectric elements 310 and 320 contract. Since the elastic body 500 maintains its original size, a bending deformation occurs, and both the non-cemented surfaces 312 and 322 become concave. The projection portion tips 521 and 522 move in a downward direction of FIGS. 8A and 8B, as respectively indicated by the arrows 531d and 532d.

The deformation states of the first and second piezoelectric elements 310 and 320 and the elastic body 500 during a section G from the time Ta to time Ta+θ in FIGS. 4A and 4B are the same as the deformation states of the first and second piezoelectric elements 310 and 320 and the elastic body 500 during the section C.

In this way, when the driving signals 900 and 901 are applied to the first and second piezoelectric elements 310 and 320, respectively, the first and second piezoelectric elements 310 and 320 and the elastic body 500 repeat the movements illustrated in FIGS. 5A and 5B to FIGS. 8A and 8B.

Figure 9:
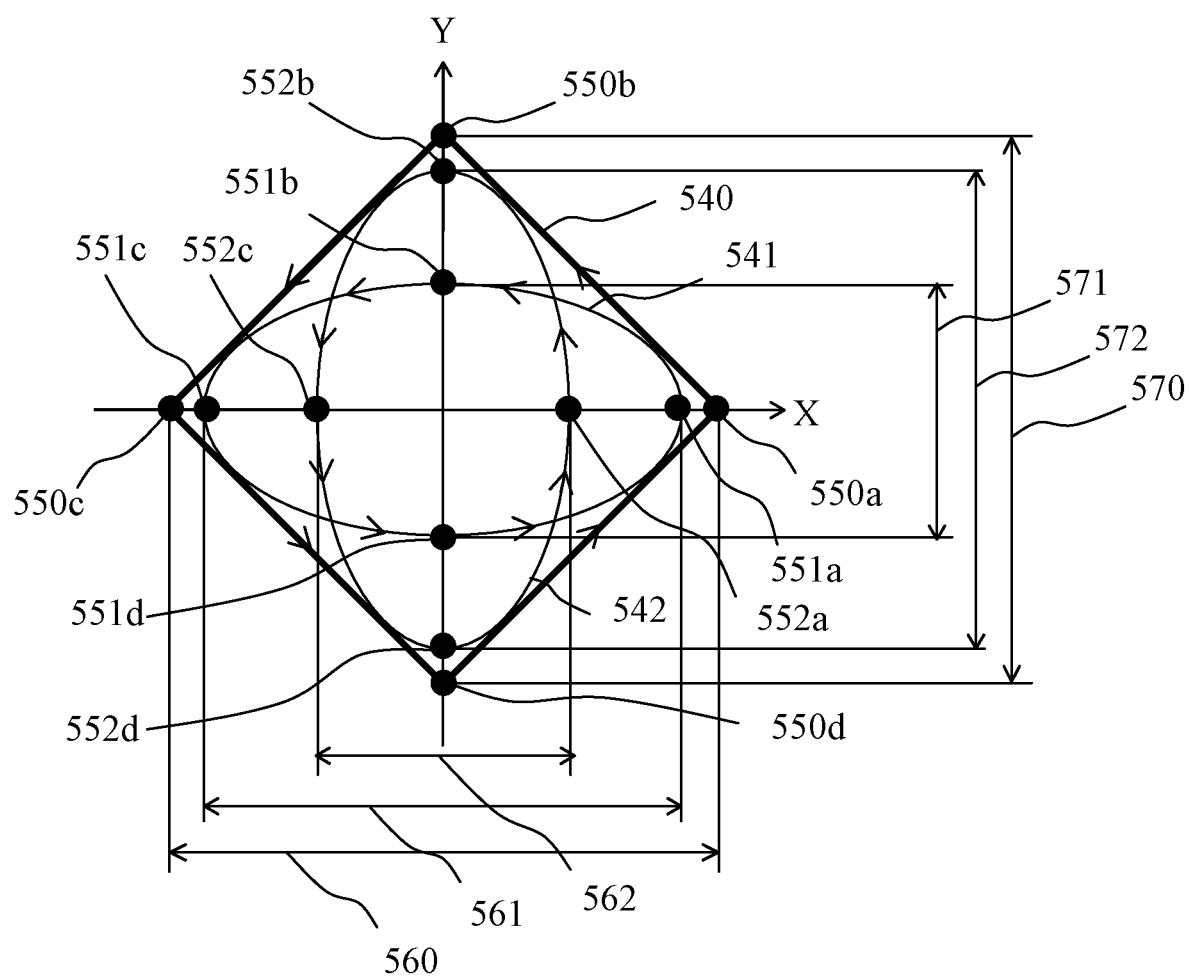
FIG. 9 is a diagram illustrating an example of a movement trajectory of a projection portion tip of the elastic body.

FIG. 9 is a diagram illustrating an example of movement trajectories of the projection portion tips 521 and 522. A horizontal axis and a vertical axis respectively indicate the positions of the projection portion tips in the X and Y directions of FIG. 3. When the driving signals 900 and 901 are applied to the first and second piezoelectric elements 310 and 320, respectively, the projection portion tips 521 and 522 move along a movement trajectory 540 indicated by a rectangle. Each of the projection portion tips 521 and 522 moves to positions indicated by points 550a, 550b, 550c and 550d during the sections C, D, E and F, and repeat this movement.

From the point 550a to the point 550c via the point 550b, the projection portion tips 521 and 522 move in a direction separate from the friction member 600, and thus the friction member 600 does not move. From the point 550c to the point 550a via the point 550d, the projection portion tips 521 and 522 move in a direction to push up the friction member 600, and thus the friction member 600 moves by a displacement amount from the point 550c to the point 550a, in the X direction. The friction member 600 can be continuously moved by applying a periodic driving signal to each of the first and second piezoelectric elements 310 and 320 and repeating the movement of each of the projection portion tips 521 and 522.

Here, a displacement of each projection portion tip in the X direction is referred to as a feeding amplitude 560, the displacement representing a moving distance per period of the friction member 600 from the point 550a to the point 550c. A displacement of each projection portion tip in the Y direction is referred to as a push-up amplitude 570, the displacement causing a separation from or push-up to the friction member 600 and not being involved in the moving distance of the friction member 600.

When the feeding amplitude 560 is equal, the shorter a period Ta, the faster a moving velocity of the friction member 600. When a period Ta is the same, the larger the feeding amplitude 560, the faster the moving velocity of the friction member 600. Since the push-up amplitude 570 is not involved in the movement of the friction member 600, the larger the push-up amplitude 570, the larger power loss.

Figure 10A:
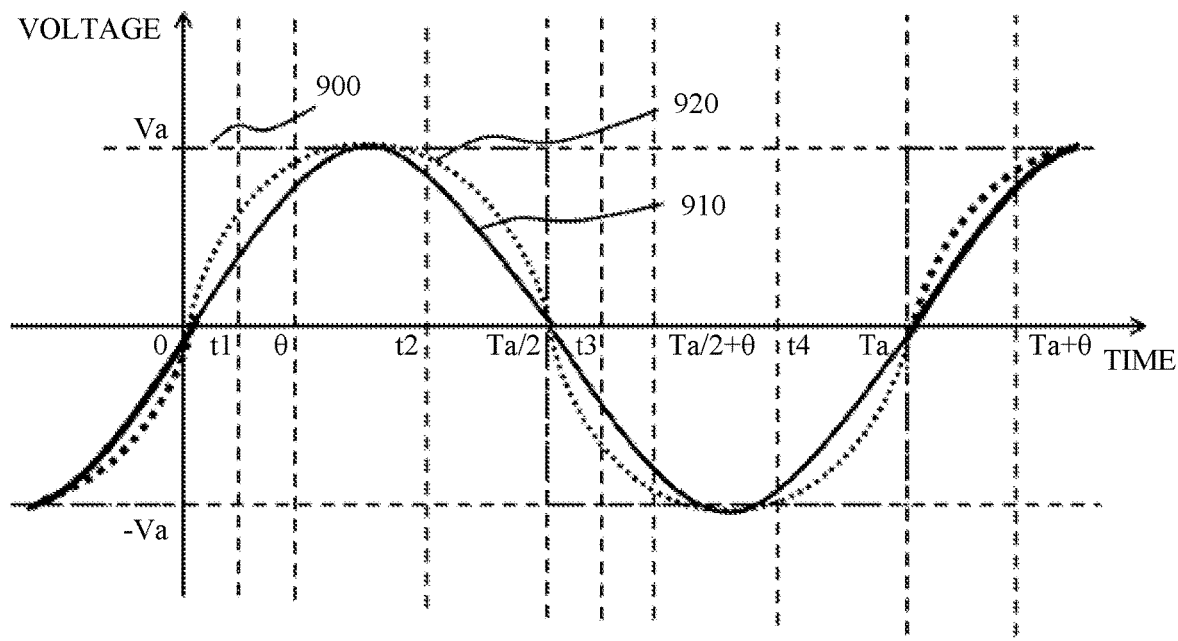
FIGS. 10A and 10B are diagrams illustrating another example of a driving signal applied to the piezoelectric element.
Figure 10B:
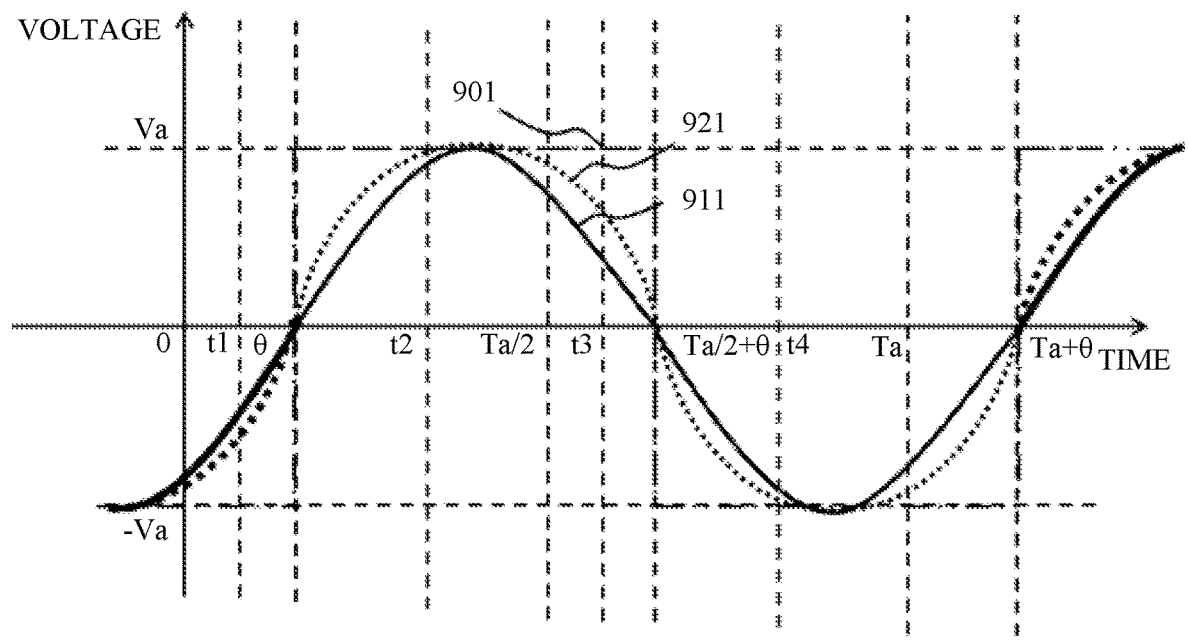

FIGS. 10A and 10B are diagrams respectively illustrating other examples of the driving signals applied to the first and second piezoelectric elements 310 and 320. In FIGS. 10A and 10B, a horizontal axis represents time and a vertical axis represents voltage. Both driving signals 910 and 911 have an amplitude of Va and a period of Ta, and are applied to the first and second piezoelectric elements 310 and 320, respectively. The driving signal 911 applied to the second piezoelectric element 320 has a same waveform as that of the driving signal 910 applied to the first piezoelectric element 310, and has a phase shifted by θ from that of the driving signal 910. The "same waveform" includes not only a case where the waveform is exactly the same, but also a case where the waveform is not the same due to various noises or the like, but is considered to be substantially the same.

At time t1, positive and negative voltages are applied to the first and second piezoelectric elements 310 and 320, respectively, and the difference between the applied voltages becomes maximum. At this time, the projection portion tips 521 and 522 move to a most right position as illustrated in FIGS. 5A and 5B. At time t2, positive voltages are applied to both the first and second piezoelectric elements 310 and 320, and the sum becomes maximum of the absolute values of the applied voltages. At this time, the projection portion tips 521 and 522 move to a highest position as illustrated in FIGS. 6A and 6B. At time t3, negative and positive voltages are applied to the first and second piezoelectric elements 310 and 320, respectively, and the difference between the applied voltages becomes maximum. At this time, the projection portion tips 521 and 522 move to a most left position as illustrated in FIGS. 7A and 7B. At time t4, negative voltages are applied to both the first and second piezoelectric elements 310 and 320, and the sum becomes maximum of the absolute values of the applied voltages. At this time, the projection portion tips 521 and 522 move to a lowest position as illustrated in FIGS. 8A and 8B.

As a phase θ approaches Ta/2, the difference increases between the applied voltages at the time t1 and t3, and the sum decreases of absolute values of the applied voltages at the time t2 and t4. Thus, the feeding amplitude increases and the push-up amplitude decreases. When phase θ becomes Ta/2, the feeding amplitude matches the feeding amplitude 560 when the driving signals 900 and 901 are applied to the first and second piezoelectric elements 310 and 320, and the push-up amplitude becomes 0.

On the other hand, when the phase θ approaches 0, the difference becomes small between the applied voltages at times t1 and t3, and the sum becomes large of the absolute values of the applied voltages at times t2 and t4. Thus, the feeding amplitude decreases and the push-up amplitude increases. When phase θ becomes 0, the feeding amplitude becomes 0, and the push-up amplitude matches the push-up amplitude 570 when the driving signals 900 and 901 are applied to the first and second piezoelectric elements 310 and 320.

In FIG. 9, an ellipse 541 represents the movement trajectory of the projection portion tips 521 and 522 when the driving signals 910 and 911 whose phase θ is close to Ta/2 are applied to the first and second piezoelectric elements 310 and 320. Points 551a, 551b, 551c, and 551d indicate the positions of the projection portion tips 521 and 522 at the time t1, t2, t3, and t4, respectively. An ellipse 542 represents the movement trajectory of the projection portion tips 521 and 522 when the driving signals 910 and 911 whose phase θ is close to 0 are applied to the first and second piezoelectric elements 310 and 320. Points 552a, 552b, 552c, and 552d indicate positions of the projection portion tips 521 and 522 at the time t1, t2, t3, and t4, respectively. When the driving signals 910 and 911 whose phase θ is close to Ta/2 are applied, a feeding amplitude 561 of each projection portion tip is large, and a push-up amplitude 571 is small. On the other hand, when the driving signals 910 and 911 whose phase θ is close to 0 are applied, a feeding amplitude 562 of each projection portion tip is small, and a push-up amplitude 572 is large. Since a size of the feeding amplitude can be changed by changing the phase θ, the movement amount and velocity of the friction member 600 can be changed.

Broken lines in FIGS. 10A and 10B indicate driving signals 920 and 921 each of which has an amplitude of Va and a period of Ta, and the driving signals 920 and 921 may be applied to the first and second piezoelectric elements 310 and 320, respectively. The driving signal 921 applied to the second piezoelectric element 320 has a phase shifted by θ from the driving signal 920 applied to the first piezoelectric element 310. Compared with the driving signals 910 and 911, each of the driving signals 920 and 921 has a larger increasing rate in a rising of the signal at the signal value (voltage) near zero, that is, an inclination of a tangent line is large at a point where the signal value is near zero. An increasing rate in a rising of the signal is small at the signal value near Va (near the peak), that is, an inclination of a tangent line is small at a point where the signal value is near a maximum value. Namely, the shapes of the waveforms (first waveform) of the driving signals 920 and 921 are closer to the shapes of the waveforms (square wave shape) of the driving signals 900 and 901 indicated by alternate long and short dash lines in FIGS. 10A and 10B, compared with the shapes of the waveforms (second waveforms) of the driving signals 910 and 911.

Figure 11A:
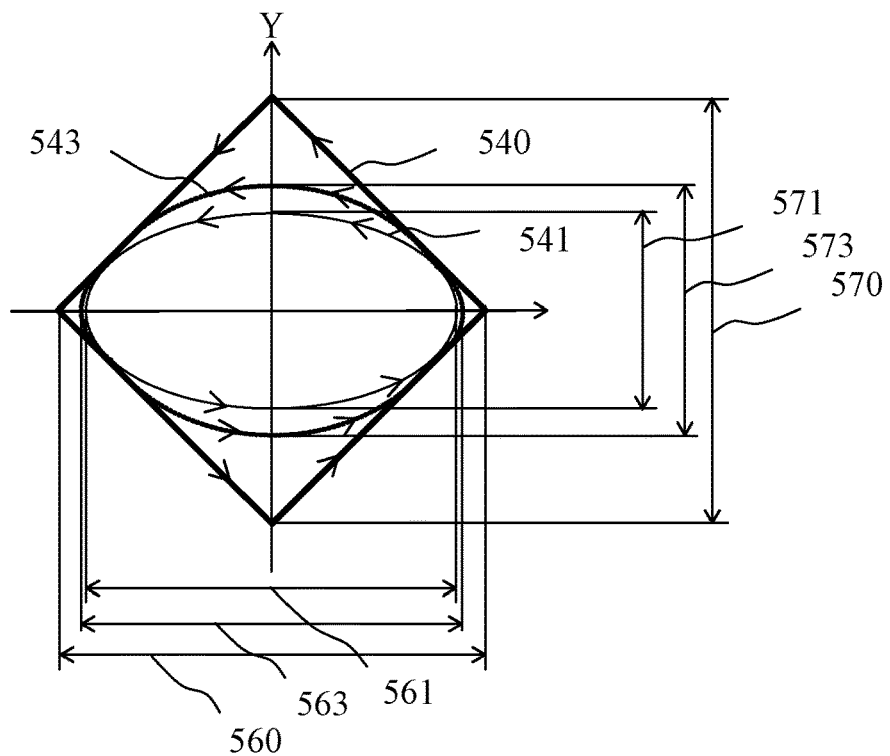
FIGS. 11A and 11B are diagrams illustrating another example of the movement trajectory of the projection portion tip of the elastic body.
Figure 11B:
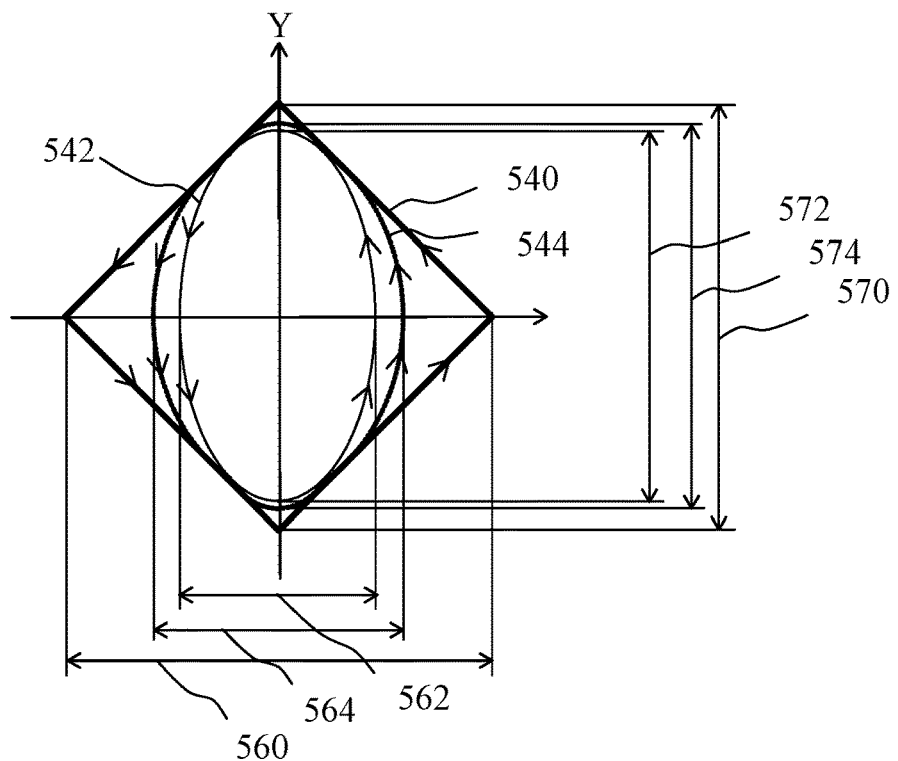

FIGS. 11A and 11B are diagrams illustrating another example of a movement trajectory of projection portion tips 521 and 522. In FIG. 11A, an ellipse 543 represents the movement trajectory of the projection portion tips 521 and 522 when the driving signals 920 and 921 whose phase θ is close to Ta/2 are applied to the first and second piezoelectric elements 310 and 320. In FIG. 11B, an ellipse 544 represents the movement trajectory of the projection portion tips 521 and 522 when the driving signals 920 and 921 whose phase θ is close to 0 are applied to the first and second piezoelectric elements 310 and 320. In FIGS. 11A and 11B, the ellipses 541 and 542 represented by solid lines are the same ellipses 541 and 542 illustrated in FIG. 9.

As described above, compared with the driving signals 910 and 911, the shapes of the waveforms of the driving signals 920 and 921 are closer the shapes of the waveforms of the driving signals 900 and 901, respectively. Thus, the movement trajectories of the projection portion tips 521 and 522 are also closer to the movement trajectories when the driving signals 900 and 901 are applied than the movement trajectories when the driving signals 910 and 911 are applied.

As described above, compared with the driving signals 910 and 911, each of the driving signals 920 and 921 has a larger increasing rate in a rising of the signal at the signal value near 0, and has a smaller increasing rate in a rising of the signal at the signal value near Va. A difference between the applied voltages at times t1 and 3 and a sum of absolute values of the applied voltages at times t2 and t4 become large. Thus, it can be explained that the movement trajectories of the projection portion tips 521 and 522 when the driving signals 920 and 921 are applied is close to those when the driving signals 900 and 901 are applied.

In FIG. 11A, a feeding amplitude 563 of each projection portion tip when the driving signals 920 and 921 are applied is substantially the same as the feeding amplitude 561 of each projection portion tip when the driving signals 910 and 911 whose phase θ is close to Ta/2 are applied. On the other hand, a push-up amplitude 573 of each projection portion tip when the driving signals 920 and 921 are applied is larger than the push-up amplitude 571 of each projection portion tip when the driving signals 910 and 911 whose phase θ is close to Ta/2 are applied.

When the phase θ is close to Ta/2, a difference is small between the feeding amplitudes 560 and 561, but a difference is large between the push-up amplitudes 570 and 571. Even if the driving signals 920 and 921 are brought closer to the driving signals 900 and 901, there is almost no room for the feeding amplitude 563 to increase, but there is room for the push-up amplitude 573 to increase.

Specifically, when the phase θ approaches Ta/2, the time t1 approaches the timing when the voltage becomes Va. However, since the voltage in the vicinity of the timing when the voltage becomes Va is almost the same among the driving signals 910, 911, 920, and 921, a difference in the applied voltages at the time t1 is also almost the same. Thus, the feeding amplitude 562 is hardly changed. On the other hand, since the time t2 approaches the timing when the voltage becomes 0, the voltage at near the time t2 changes significantly due to the change in the increasing rate in the rising of the signal. Thus, the sum of the absolute values of the applied voltages at the time t2 changes significantly, and the push-up amplitude 572 also changes significantly.

In FIG. 11B, a feeding amplitude 564 of each projection portion tip when the driving signals 920 and 921 are applied is larger than the feeding amplitude 562 of each projection portion tip when the driving signals 910 and 911 whose phase θ is close to 0 are applied. On the other hand, a push-up amplitude 574 of each projection portion tip when the driving signals 920 and 921 are applied is substantially the same as the push-up amplitude 572 of each projection portion tip when the driving signals 910 and 911 whose phase θ is close to 0 are applied.

When the phase θ is close to 0, the difference is large between the feeding amplitudes 560 and 562, but the difference is small between the push-up amplitudes 570 and 572. Thus, even if the driving signals 920 and 921 are brought closer to the driving signals 900 and 901, there is room for the feeding amplitude 564 to increase, but there is almost no room for the push-up amplitude 574 to increase.

Specifically, when the phase θ approaches 0, the time t1 approaches the timing when the voltage becomes 0. Thus, the voltage near the time t1 changes significantly due to the change in the increasing rate in the rising of the signal. Thereby, the difference between the applied voltages at the time t1 changes significantly, and the feeding amplitude 564 also changes significantly. On the other hand, at the time t2, the timing when the voltage becomes Va approaches, but the voltage near the timing when the voltage becomes Va is almost the same among those of the driving signals 910, 911, 920 and 921, and the sum of the absolute values of applied voltages at the time t2 is also almost the same. Hence, the push-up amplitude 574 is hardly changed.

The push-up amplitudes 573 and 574 do not affect the movement of the friction member 600 in the X direction. Thus, when the ratio increases of the push-up amplitudes 573 and 574 to the feeding amplitudes 563 and 564, wasteful power increases, which does not contribute to operation. Since the projection portion tips 521 and 522 are separated from the friction member 600 for a long time, an output torque decreases and a driving characteristic is deteriorated.

As described above, if, when the phase θ is close to Ta/2, the driving signals 920 and 921 are applied, each of which has the large increasing rate in the rising of signal at the signal value near 0, the feeding amplitude 563 hardly increases, but the push-up amplitude 573 significantly increases. Thus, as power consumption increases, the output torque decreases and the driving characteristic deteriorates. When the phase θ is close to Ta/2, the driving signals 910 and 911 may be applied, each of which has a small increasing rate in the rising of signals at the signal value near 0 and has the shapes of the waveforms far from those of the driving signals 900 and 901.

On the other hand, if, when the phase θ is close to 0, the driving signals 920 and 921 are applied each of which has the large increasing rate in the rising of the signal at the signal value near 0, the feeding amplitude 564 greatly increases, but the push-up amplitude 574 hardly increases. A driving efficiency increases and the power consumption decreases. The output torque increases and the driving characteristic improves. Thus, when the phase θ is close to 0, the driving signals 920 and 921 may be applied, each of which has the large increasing rate in the rising of signal at the signal value near 0 and has the shape of waveform close to the driving signals 900 and 901.

Figure 12:
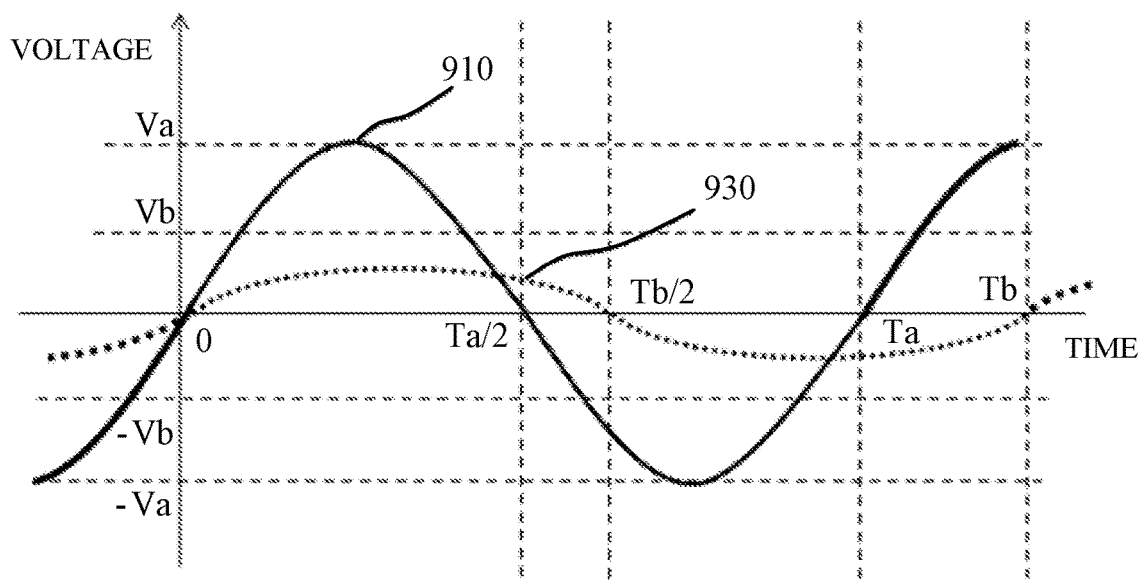
FIG. 12 is a diagram illustrating another example of the driving signal applied to the piezoelectric element.

FIG. 12 is a diagram illustrating another example of a driving signal applied to each of the first and second piezoelectric elements 310 and 320. In FIG. 12, a horizontal axis represents time and a vertical axis represents voltage. A driving signal 930 having an amplitude of Vb and a period of Tb and a driving signal whose phase is shifted by θ from and the driving signal 930 may be applied to the first and second piezoelectric elements 310 and 320, respectively. When the driving signals 910 and 930 are compared, signals may be used which is normalized so that the amplitudes Va and Vb and the periods Ta and Tb are equal.

Figure 13:
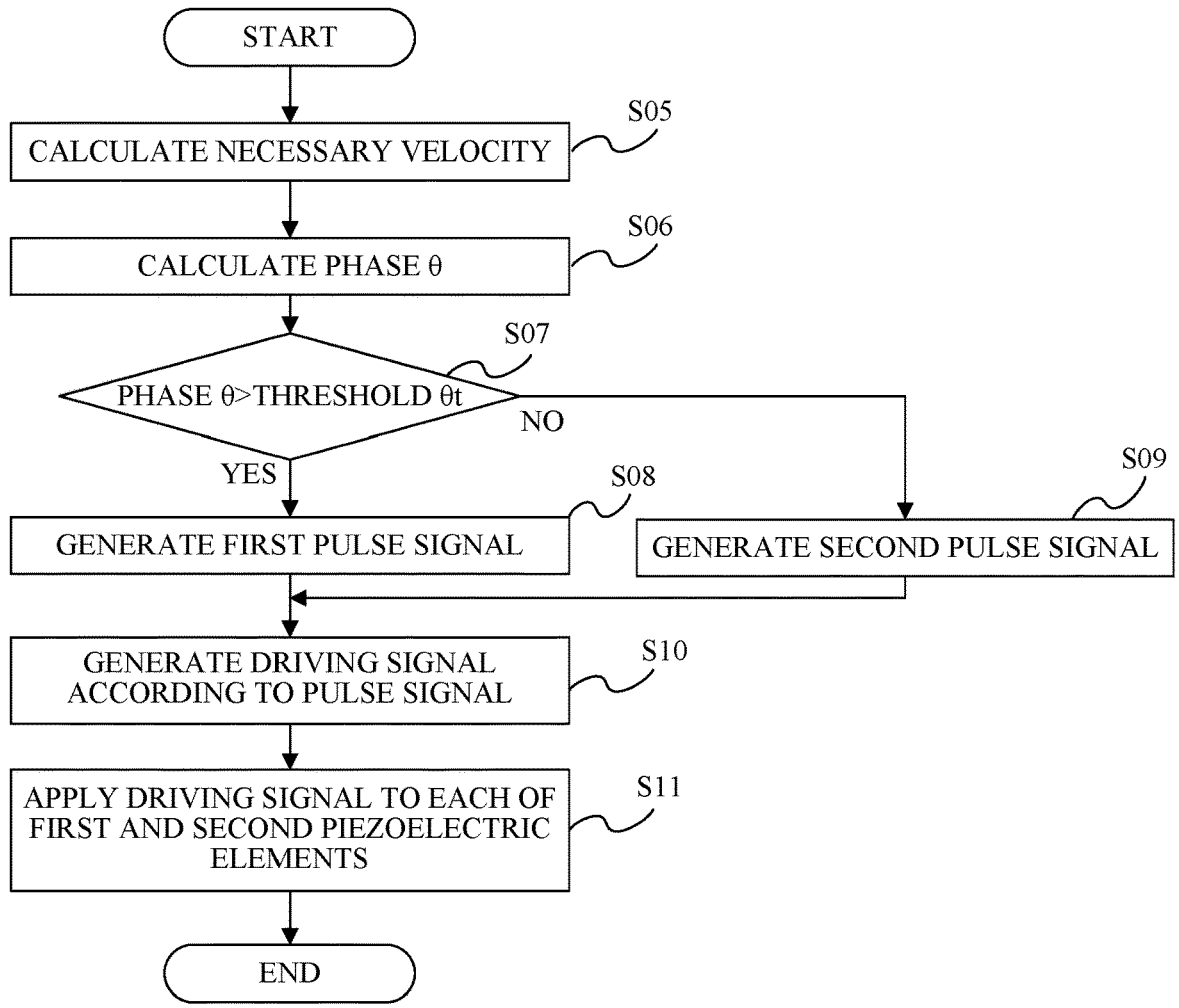
FIG. 13 is a flowchart illustrating details of processing of steps S03 and S04 of FIG. 2 executed by a driving signal generating/applying unit.

Hereinafter, the details will be described of generation of the driving signal performed by the driving signal generating/applying unit 400 with reference to FIG. 13. FIG. 13 is a flowchart illustrating details of processing of steps S03 and S04 in FIG. 2 executed by the driving signal generating/applying unit 400.

In step S05, the driving signal generating/applying unit 400 calculates the velocity, which the vibration actuator 2 needs to output, by using the target position and the target velocity acquired from the position instructing unit 100 and using the current position of the movable portion acquired from the position detector 200.

In step S06, the driving signal generating/applying unit 400 calculates the phase θ for outputting the velocity calculated in step S05. This embodiment can change the feeding amplitude by changing the phase θ, and can change the velocity of the vibration actuator 2. The driving signal generating/applying unit 400 can calculate the phase θ for outputting a required velocity.

In step S07, the driving signal generating/applying unit 400 determines whether the phase θ calculated in step S06 is larger than a threshold θt. When the phase θ is larger than the threshold θt, the process proceeds to step S08, and when the phase θ is smaller than the threshold θt, the process proceeds to step S09. When the phase θ is equal to the threshold θt, which step the process proceeds to may be arbitrary set.

In step S08, the driving signal generating/applying unit 400 generates a first pulse signal 940, which is a basis of the driving signal 910.

In step S09, the driving signal generating/applying unit 400 generates a second pulse signal 950, which is a basis of the driving signal 930.

Figure 14A:
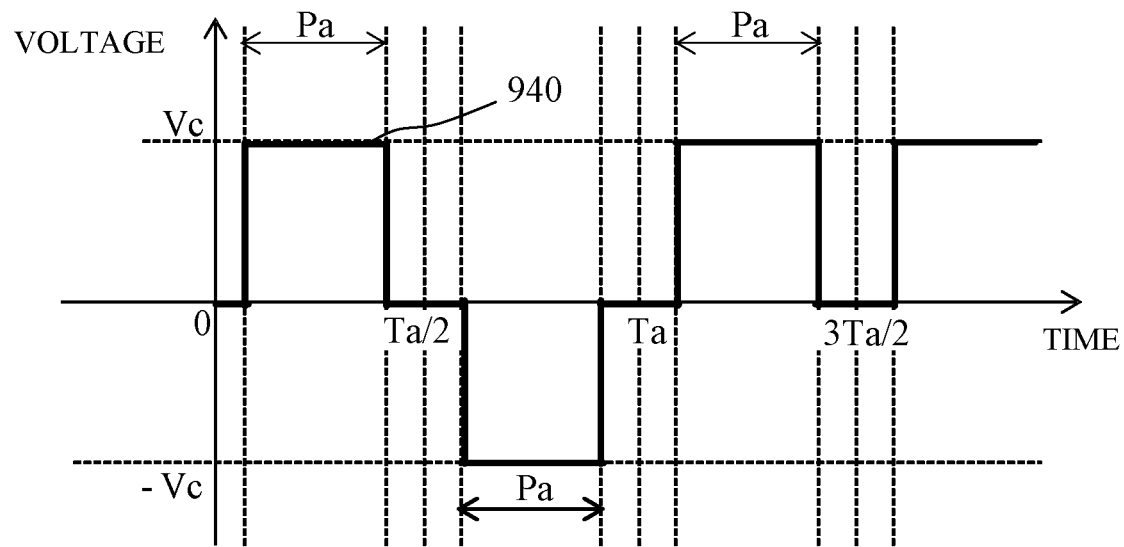
FIGS. 14A and 14B are diagrams illustrating first and second pulse signals.
Figure 14B:
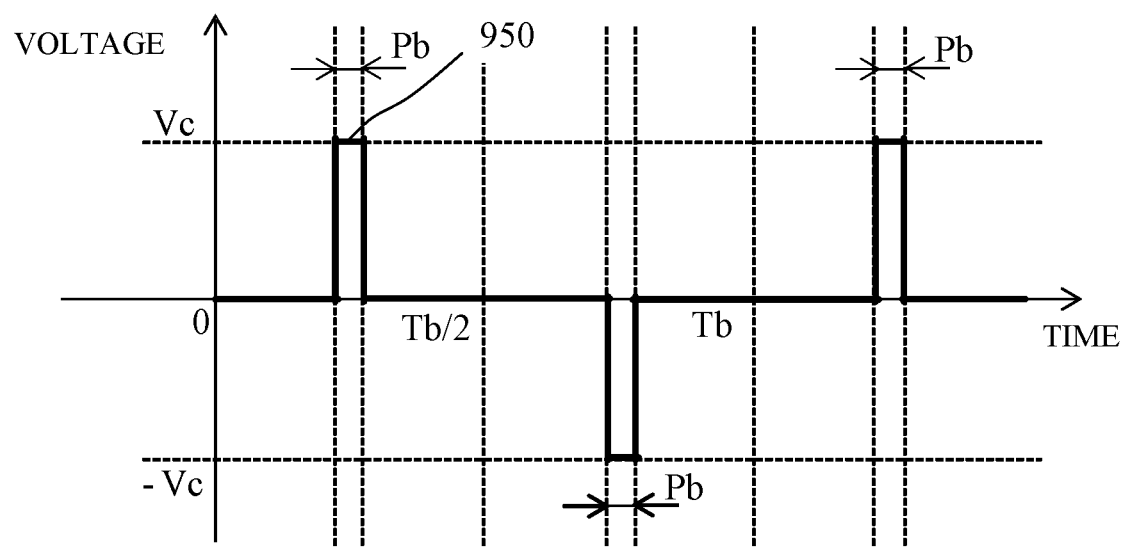

FIGS. 14A and 14B are diagrams illustrating the first and second pulse signals 940 and 950, respectively. In FIGS. 14A and 14B, a horizontal axis represents time and a vertical axis represents voltage. Both the first and second pulse signals 940 and 950 have an amplitude of Vc and are composed of only three values, positive voltage Vc, negative voltage −Vc, and zero. The first pulse signal 940 has a pulse width of Pa and a period of Ta in each of the positive voltage Vc and the negative voltage −Vc. The second pulse signal 950 has a pulse width of Pb and a period of Tb in each of the positive voltage Vc and the negative voltage −Vc. A ratio (duty ratio) 2 Pa/Ta of the sum of the pulse widths of the positive and negative voltages to the period Ta of the first pulse signal 940 is larger than a ratio (duty ratio) 2 Pb/Tb of the sum of the pulse widths of the positive and negative voltages to the period Tb of the second pulse signal 950. The first pulse signal 940 may be composed of only two values, the positive voltage Vc and the negative voltage −Vc while the case where the voltage value is zero is excluded.

In step S10, the driving signal generating/applying unit 400 inputs one of the first and second pulse signals 940 and 950 to an electric circuit (not illustrated). This electric circuit can blunt the waveform, and can generate a signal like a sine wave when a pulse signal is input. In this embodiment, the electric circuit can generate the driving signals 910 and 930 based on the first and second pulse signals 940 and 950, respectively, by blunting the first and second pulse signals 940 and 950. The periods of the driving signals 910 and 930 are the same as the periods of first and second pulse signals 940 and 950, respectively. Since the driving signals 910 and 930 are generated by blunting the first and second pulse signals 940 and 950, respectively, both the amplitudes Va and Vb of the driving signals 910 and 930 are smaller than the amplitude Vc. Since the duty ratio 2 Pa/Ta of the first pulse signal 940 is larger than the duty ratio 2 Pb/Tb of the second pulse signal 950, the amplitude Va of the driving signal 910 is larger than the amplitude Vb of the driving signal 930.

The first and second pulse signals 940 and 950 can easily change the pulse widths Pa and Pb and the periods Ta and Tb only by switching ON/OFF of the voltage. By changing the pulse widths Pa and Pb and the periods Ta and Tb, the amplitudes Va and Vb and the periods Ta and Tb of the driving signals 910 and 930 can be easily changed. Thus, it is possible to change the amplitude, period, increasing rate in rising of the signal, and the like more easily than when the driving signals 910 and 930 are directly generated.

Here, since the driving signals 910 and 930 generated based on the first and second pulse signals 940 and 950 have different amplitudes Va and Vb and periods Ta and Tb, the driving signals 910 and 930 are compared using normalized signals which are acquired by a normalization performed so that the amplitudes Va and Vb and the periods Ta and Tb match respectively. For example, when the amplitude Vb and the period Tb of the driving signal 930 are normalized so that they match the amplitude Va and the period Ta of the driving signal 910, respectively. Ta/Tb may be integrated to an entire time component of the driving signal 930 and Va/Tb may be integrated to an entire voltage component of the driving signal 930. A converted signal acquired by normalizing the driving signal 930 is the driving signal 920 of FIGS. 10A and 10B. Since a duty ratio 2 Pb/Tb of the second pulse signal 950 is smaller than a duty ratio 2 Pa/Ta of the first pulse signal 940, the second pulse signal 950 has a stronger high frequency component than that of the first pulse signal 940. Hence, the driving signal 930 generated based on the second pulse signal 950 also has a stronger high frequency component than that of the driving signal 910 generated based on the first pulse signal 940. Thus, the driving signal 920 acquired by normalizing the driving signal 930 is closer to the driving signal 900 than the driving signal 910, the driving signal 900 having a large increasing rate in the rising of the signal at the signal value near 0 and has a small increasing rate in the rising of the signal at the signal value near Va.

In step S11, the driving signal generating/applying unit 400 applies the driving signal 910 or the driving signal 930 generated in step S10 to the first and second piezoelectric elements 310 and 320 while shifting the signal by the phase θ calculated in step S06. Thereby, a spheroidal motion is caused at the projection portion tips 521 and 522, and the friction member 600 can be moved.

When the phase θ is equal to the threshold θt, the pulse widths Pa and Pb and the periods Ta and Tb may be set so that the moving velocity of the friction member 600 is substantially the same regardless of whether the first or second pulse signals 940 or 950 is used.

When the amplitudes increase of the driving signals applied to the first and second piezoelectric elements 310 and 320, an amount changes of the deformation of the first and second piezoelectric elements 310 and 320, and a size increases of the spheroidal motion caused at the projection portion tips 521 and 522. On the other hand, even if the amplitudes of the driving signals are the same, when the period of the driving signal approaches the period of the resonance frequency of the elastic body 500, the resonance generated in the elastic body 500 increases, and thus the amount of the spheroidal motion increases.

In this embodiment, the amplitude Va of the driving signal 910 generated based on the first pulse signal 940 is larger than the amplitude Vb of the driving signal 930 generated based on the second pulse signal 950. Thus, when the periods of the driving signals 910 and 930 are the same, using the driving signal 910 makes the spheroidal motion larger and the moving velocity of the friction member 600 faster than using the driving signal 930. If the period Tb of the driving signal 930 is closer to the period of the resonance frequency of the elastic body 500 than to the period Ta of the driving signal 910, when the phase θ is equal to the threshold θt, the moving velocity of the friction member 600 can be made substantially the same regardless of whether the first or second pulse signals 940 or 950 are used. In such a setting, when the used pulse signal is switched, it is possible to prevent the velocity from changing suddenly.

If such a setting is not available, the change in the velocity caused by the change in the pulse signal may be minimized by reducing amounts of changes in the pulse widths Pa and Pb and the periods Ta and Tb of the first and second pulse signals 940 and 950 as much as possible. In this case, the pulse signal may be set to two or more types, the pulse signal may be gradually switched, and the pulse widths Pa and Pb and the periods Ta and Tb may be switched smoothly.

When the phase θ is close to the periods Ta/2 and Tb/2, the vibration actuator 2 may be driven by using the first pulse signal 940 having a large duty ratio. Such a configuration can reduce the power consumption and can increase the output torque as compared with a case where the vibration actuator 2 is driven by using the second pulse signal 950. The shape of the waveform of the driving signal 920 acquired by normalizing the driving signal 930 generated based on the second pulse signal 950 has a shape of a waveform closer to the driving signal 900 than that of the driving signal 910 generated based on the first pulse signal 940. As illustrated in FIG. 11A, when the first pulse signal 940 is used, the ratio of the push-up amplitude to the feeding amplitude is smaller than when the second pulse signal 950 is used. Thus, when the phase θ is close to Ta/2 and Tb/2, the driving characteristic and the driving efficiency can be improved by driving the vibration actuator 2 using the first pulse signal 940.

On the other hand, when the phase θ is close to 0, the vibration actuator 2 may be driven by using a second pulse signal 950 having a small duty ratio. Such a configuration can reduce the power consumption and can increase the output torque as compared with the case where the vibration actuator 2 is driven by using the first pulse signal 940. This is because the shape of the waveform of the driving signal 920, which is the normalized driving signal 930 generated based on the second pulse signal 950, has a shape of a waveform closer to that of the driving signal 900 than that of the driving signal 910 generated based on the first pulse signal 940. As illustrated in FIG. 11B, when the second pulse signal 950 is used, the ratio of the feeding amplitude to the push-up amplitude is larger than when the first pulse signal 940 is used. Thus, when the phase θ is close to 0, the driving characteristic and the driving efficiency can be improved by driving the vibration actuator 2 using the second pulse signal 950.

The configuration of this embodiment can provide control of the vibration actuator 2 having the large output torque, good driving characteristic and good driving efficiency, by properly using the first and second pulse signals 940 or 950 according to the phase θ

This embodiment selects the driving signal depending on whether the phase θ is larger than the predicted value, but may use a driving signal whose shape of the waveform becomes closer to the square wave shape as the phase θ becomes smaller.

The threshold θt may be set to the phase θ in which at least one of the parameters indicating the driving characteristics, such as the power consumption and the output torque, and the driving efficiency are substantially the same when the driving is performed by using the first and second pulse signals 940 and 950. With such a setting of the threshold θt, when the phase θ is larger than the threshold t, the driving efficiency and the driving characteristic can be improved by driving the vibration actuator 2 using the first pulse signal 940. On the other hand, when the phase θ is smaller than the threshold θt, the driving efficiency and the driving characteristic can be improved by driving the vibration actuator 2 using the second pulse signal 950. Thus, the pulse signal can be properly selected regardless of the value of the phase θ.

In this embodiment, the method has been described of driving the vibration actuator 2 by switching between two pulse signals, but the present invention is not limited to this. The method has been described of blunting the pulse signal to generate the driving signal applied to the first and second piezoelectric elements 310 and 320, but the present invention is not limited this. For example, the driving signals 910 and 930 may be directly generated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above embodiment can provide a driving control apparatus, a driving apparatus, and a driving control method each of which can drive a vibration actuator with low power and high torque.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-227908, filed on Dec. 18, 2019 which is hereby incorporated by reference herein in its entirety.

What is claimed is:

1. A driving control apparatus that controls driving of a vibration actuator having a plurality of electromechanical energy conversion elements, the driving control apparatus comprising:
    a controller configured to generate a plurality of driving signals each of which has a waveform which is the same and a phase which is different, and to respectively apply the plurality of driving signals to different elements of the plurality of electromechanical energy conversion elements,
    wherein the controller changes the waveform according to the phase, and
    wherein a shape of a first waveform according to a first phase is closer to a square wave shape than a shape of a second waveform according to a second phase that is larger than the first phase.

2. The driving control apparatus according to claim 1, wherein an inclination of a tangent line at a point where a signal value of a driving signal of the first waveform becomes zero is larger than an inclination of a tangent line at a point where a signal value of a driving signal of the second waveform becomes zero.

3. The driving control apparatus according to claim 1, wherein when the phase is larger than a predetermined value, the controller generates a driving signal having the second waveform, and
    wherein when the phase is smaller than the predetermined value, the controller generates a driving signal having the first waveform.

4. The driving control apparatus according to claim 1, wherein when at least one of a driving signal having the first waveform and a driving signal having the second waveform is converted so that amplitudes and periods are equal between the driving signals, the driving signal having the first waveform has a shape closer to a square wave than that of the driving signal having the second waveform.

5. The driving control apparatus according to claim 1, wherein at least one of an amplitude and a period of a driving signal having the first waveform is different from that of a driving signal having the second waveform.

6. The driving control apparatus according to claim 1, wherein the controller changes the waveform so as to make the waveform closer to a square wave shape as the phase becomes smaller.

7. A driving control apparatus that controls driving of a vibration actuator having a plurality of electromechanical energy conversion elements, the driving control apparatus comprising:
    a controller configured to generate a plurality of driving signals each of which has a waveform which is the same and a phase which is different, and to respectively apply the plurality of driving signals to different elements of the plurality of electromechanical energy conversion elements, and
    wherein the controller changes the waveform according to the phase,
    wherein the plurality of driving signals includes a positive value and a negative value each of which has a same absolute value, and is generated using a pulse signal in which a pulse width of the positive value and a pulse width of the negative value are the same, and wherein a ratio of a sum of pulse widths of the positive and negative values to one period of a first pulse signal, that is a basis of a driving signal having a first waveform according to a first phase, is smaller than a ratio of a sum of pulse widths of the positive and negative values to one period of a second pulse signal, that is a basis of a driving signal having a second waveform according to a second phase that is larger than the first phase.

8. The driving control apparatus according to claim 7, wherein when at least one of the driving signal having the first waveform and the driving signal having the second waveform is converted so that amplitudes and periods are equal between the driving signals, the driving signal having the first waveform has a shape closer to a square wave than that of the driving signal having the second waveform.

9. The driving control apparatus according to claim 7, wherein at least one of an amplitude and a period of the driving signal having the first waveform is different from that of a driving signal of having the second waveform.

10. The driving control apparatus according to claim 7, wherein the controller changes the waveform so as to make the waveform closer to a square wave shape as the phase becomes smaller.

11. The driving control apparatus according to claim 7, wherein the controller provides a change so as to decrease a ratio of a sum of positive and negative pulse widths to one period of the pulse signal, as the phase becomes smaller.

12. A driving apparatus comprising:
a vibration actuator having a plurality of electromechanical energy conversion element;
a controller configured to generate a plurality of driving signals each of which has a waveform which is the same and a phase which is different, and to respectively apply the plurality of driving signals to different elements of the plurality of electromechanical energy conversion elements; and
a driven body configured to be moved by a force of the vibration actuator,
wherein the controller changes the waveform according to the phase, and
wherein a shape of a first waveform according to a first phase is closer to a square wave shape than a shape of a second waveform according to a second phase that is larger than the first phase.

13. The driving apparatus according to claim 12, wherein a number of the plurality of electromechanical energy conversion elements is two.

14. The driving apparatus according to claim 12, wherein a velocity of the vibration actuator is changed according to the phase.

15. A driving control method for controlling driving of a vibration actuator having a plurality of electromechanical energy conversion element, the driving control method comprising:
generating a plurality of driving signals each of which has a waveform which is the same and a phase which is different; and
applying the plurality of driving signals to different elements of the plurality of electromechanical energy conversion elements,
wherein the waveform is changed according to the phase, and
wherein a shape of a first waveform according to a first phase is closer to a square wave shape than a shape of a second waveform according to a second phase that is larger than the first phase.

* * * * *